(12) United States Patent
Harrup et al.

(10) Patent No.: US 8,327,541 B2
(45) Date of Patent: Dec. 11, 2012

(54) METHOD OF ASSEMBLING A DIFFERENTIAL MECHANISM

(75) Inventors: Clive James Harrup, Bedfordshire (GB); Roberto Gianone, Barengo (IT); Marco Bassi, Novate Milanese (IT)

(73) Assignee: Meritor Heavy Vehicle Systems Cameri SpA, Cameri (IT)

( * ) Notice: Subject to any disclaimer, the term of this patent is extended or adjusted under 35 U.S.C. 154(b) by 1055 days.

(21) Appl. No.: 12/162,029

(22) PCT Filed: Jan. 26, 2007

(86) PCT No.: PCT/GB2007/000269
§ 371 (c)(1),
(2), (4) Date: Nov. 21, 2008

(87) PCT Pub. No.: WO2007/085844
PCT Pub. Date: Aug. 2, 2007

(65) Prior Publication Data
US 2009/0084223 A1 Apr. 2, 2009

(30) Foreign Application Priority Data
Jan. 27, 2006 (GB) .................................. 0601716.4

(51) Int. Cl.
*B21D 53/28* (2006.01)
*B21K 1/30* (2006.01)
*B23P 15/14* (2006.01)
*B23P 19/02* (2006.01)
*B23P 11/00* (2006.01)

(52) U.S. Cl. .......... 29/893.2; 29/893.1; 29/893; 29/525; 29/DIG. 48

(58) Field of Classification Search .................... 29/893, 29/893.1, 893.2, DIG. 48; 74/606 R, 607; 475/230, 231; 180/378, 380
See application file for complete search history.

(56) References Cited

U.S. PATENT DOCUMENTS

| 4,125,026 A | 11/1978 | Torii et al. |
| 4,207,780 A | 6/1980 | Saxton |
| 4,688,962 A * | 8/1987 | Koltookian ................ 403/408.1 |

(Continued)

FOREIGN PATENT DOCUMENTS

DE 4042173 7/1992

(Continued)

OTHER PUBLICATIONS

International Search Report mailed Apr. 3, 2007.

(Continued)

*Primary Examiner* — Sarang Afzali
(74) *Attorney, Agent, or Firm* — Carlson, Gaskey & Olds, PC

(57) ABSTRACT

A differential gear casing of flower pot construction has an outer surface which is configured for receiving a crown wheel, whereby the crown wheel can be pressed onto the outer surface by different amounts for different applications. The outer surface is free from projections such that the crown wheel can be mounted on the outer surface from any axial direction. The outer surface defines a band on the differential gear casing and is parallel with a central axis of the differential gear casing. The crown wheel is secured to the differential gear casing using an axial weld line. In other embodiments, the crown wheel and/or a cover for the differential gear casing are secured in place using axial and/or radial weld lines.

8 Claims, 10 Drawing Sheets

U.S. PATENT DOCUMENTS

| | | | |
|---|---|---|---|
| 5,533,423 A | 7/1996 | Stehle et al. | |
| 6,045,479 A | 4/2000 | Victoria et al. | |
| 6,139,461 A | 10/2000 | Eschenburg | |
| 6,379,277 B1 | 4/2002 | Victoria et al. | |
| 6,589,671 B1 | 7/2003 | Kehrer | |
| 6,648,788 B1 | 11/2003 | Sullivan | |
| 6,699,154 B2 * | 3/2004 | Orr et al. | 475/230 |
| 6,705,965 B2 | 3/2004 | Sullivan | |
| 6,883,235 B2 | 4/2005 | Bell | |
| 6,945,898 B2 * | 9/2005 | Szuba | 475/230 |
| 6,949,046 B2 | 9/2005 | Bell | |
| 7,008,345 B2 * | 3/2006 | Phelan et al. | 475/231 |
| 7,261,664 B2 * | 8/2007 | Szuba | 475/230 |
| 2001/0039228 A1 | 11/2001 | Eulenstein et al. | |
| 2004/0116235 A1 | 6/2004 | Szuba | |
| 2005/0090358 A1 | 4/2005 | Phelan et al. | |
| 2006/0063634 A1 | 3/2006 | Szuba | |
| 2008/0188343 A1 | 8/2008 | Pan et al. | |

FOREIGN PATENT DOCUMENTS

| | | |
|---|---|---|
| DE | 10238236 | 3/2004 |
| FR | 2343403 | 9/1977 |
| GB | 1031854 | 6/1966 |
| JP | 2005081351 | 3/2005 |
| WO | 2004/053357 | 6/2004 |

OTHER PUBLICATIONS

Great Britain Search Report dated May 19, 2006.

* cited by examiner

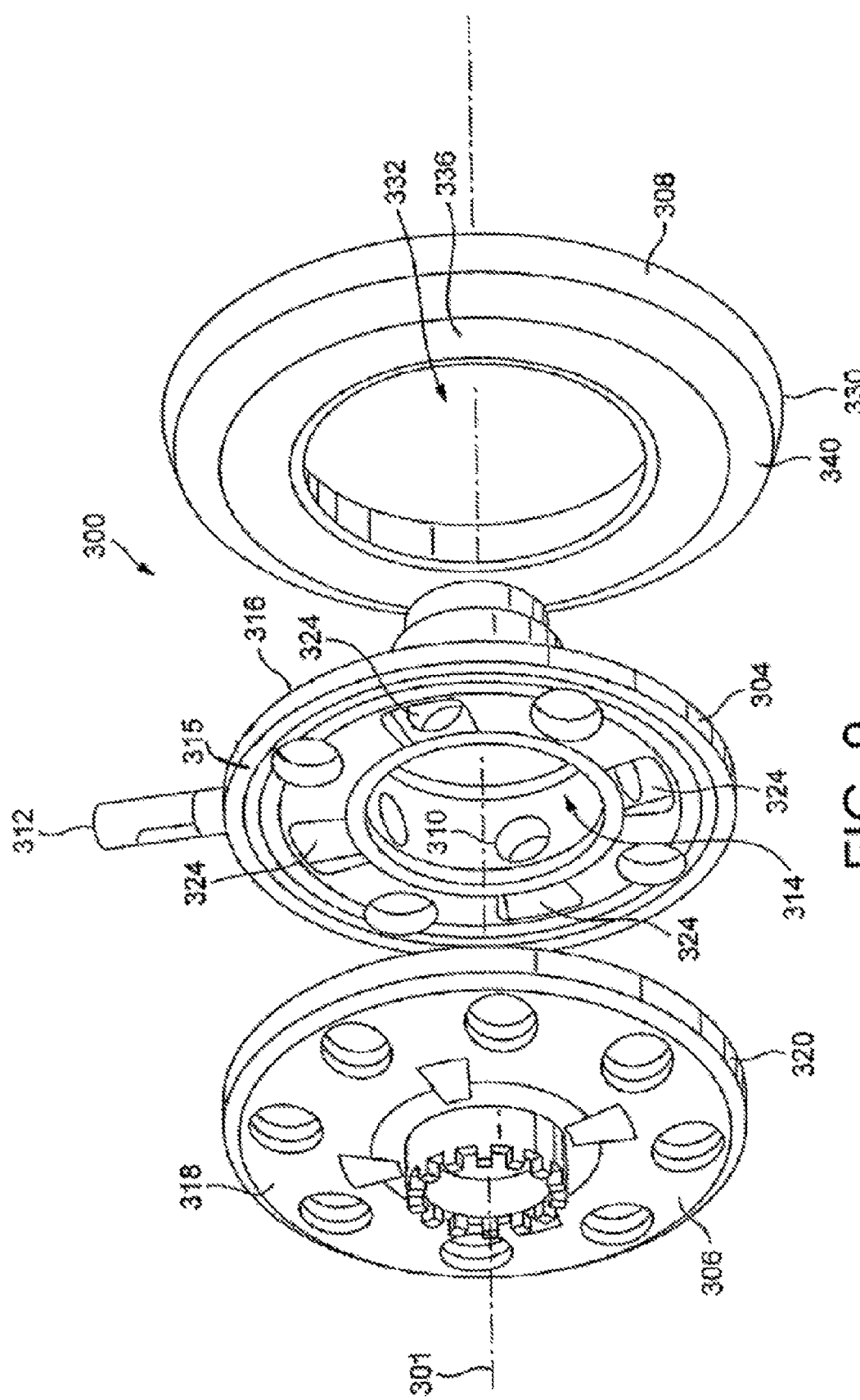

METHOD OF ASSEMBLING A DIFFERENTIAL MECHANISM

REFERENCE TO RELATED APPLICATIONS

This application is a United States National Phase Application of PCT Application No. PCT/GB2007/000269 filed on Jan. 26, 2007, which claims priority to United Kingdom Application No. GB 0601716.4 filed Jan. 27, 2006.

BACKGROUND OF THE INVENTION

The present invention relates generally to differential gear casings for motor vehicles, and particularly to methods of manufacture of differential gear casings.

Differentials are provided in driven axles of vehicles to permit left and right driven wheels to rotate at different speeds while transmitting torque. As is well known, such an arrangement is required to permit a vehicle to turn from a straight line.

Many different kinds of differentials have been proposed, but the most common consists of a casing in which two or four freely rotatable pinion gears are arranged in mesh with opposite side gears of vehicle drive shafts. The casing carries an annular crown wheel which is intended to be driven by a pinion of an input shaft rotatably driven by a vehicle engine.

Casings for differential gears have a number of exacting requirements. They must, of course, have sufficient strength to adequately resist distortion underload. In particular, the casing must be stiff enough to ensure that teeth of internal gears remain in accurate mesh to avoid unnecessary wear and noise. Furthermore, the casing must be capable of being accurately machined to ensure that initial placement of components is accurate and that, for example, bearing surfaces are correctly aligned. This latter requirement can be problematic in casings assembled from two major components.

Yet another difficulty is that the casing design must permit ready assembly thereof. For this purpose, the casing may include windows to permit insertion of pinions, thrust washers and other components. However, such windows inevitably weaken a casing wall, which must be correspondingly stiffened.

There is a need for an improved casing for a differential and an improved method of assembly of the differential.

SUMMARY OF THE INVENTION

According to a first aspect of the present invention, a differential gear casing, in one example of flower-pot-type construction, has an outer surface which is configured for receiving a crown wheel. The crown wheel can be pressed onto the outer surface by different amounts for different applications. Conveniently, the outer surface is annular and free from projections or the like, such that the crown wheel can be mounted on the outer surface from any axial direction.

In one example, the casing defines a central axis, and the outer surface is parallel with the central axis such that the crown wheel can be secured to the differential gear casing using an axial weld line.

In one embodiment, the outer surface along which the crown wheel can be positioned defines a band on the differential gear casing, and the crown wheel can be positioned on the band from both axial directions.

According to another aspect of the invention, a differential mechanism includes a casing for an arrangement of differential gears and a ring gear for mounting about the casing. The casing has a major axis of rotation and an external surface concentric with the major axis of rotation onto which the ring gear is press-fitted. The external surface defines a plurality of stop locations for the ring gear so that the ring gear can be press-fitted onto the casing by a predetermined amount to one of the stop locations, so that the differential mechanism is configured for use with a drive shaft pinion of a predetermined ratio complimentary to the position of the ring gear at the stop location.

Conveniently, the external surface is annular and free from projections or the like such that the ring gear can be mounted on the external surface from both axial directions.

According to another aspect of the invention, there is also provided a method of assembling a differential mechanism including a casing having a major axis of rotation and defining a chamber for an arrangement of differential gears. The differential mechanism further includes a ring gear for mounting about the casing. The method includes the steps of fitting the ring gear onto an external surface of the casing and securing the ring gear on the casing by at least one laser weld along a generally axial line of interface between the casing and the ring gear.

According to a further aspect of the invention, there is provided a method of assembling a differential mechanism including a casing having a major axis of rotation and defining a chamber for an arrangement of differential gears. The casing includes a main body having an opening through which the differential gears are intended to be fitted in the casing, and the casing also has a cover for the opening. The differential mechanism further includes a ring gear for mounting about the casing. The method includes the steps of mounting the cover over an open end of the main body, securing the cover onto the main body by a laser weld along a generally axial line of interface between the main body and the cover, fitting the ring gear onto an external surface of the casing, and securing the ring gear on the casing by a laser weld along a generally radial line of interface between the ring gear and the cover. A differential assembly can be made according to the above method.

In one example, the laser weld between the cover and the main body is formed as a generally annular weld, concentric with the major axis of rotation. In one example, the laser weld between the cover and the ring gear is formed as a generally annular weld, concentric with the axis of rotation. In one example, the main body is rotated about the axis during welding.

In one embodiment, a relief region is provided adjacent the interface between the ring gear and the cover for accommodating the end of a laser weld tool proximate the radial interface for directing a weld beam along the interface. In one example, the cover is used to clamp the differential gears in an operative condition within the casing. In one example, the cover includes a bearing surface for rotatably supporting one of the differential gears for rotation about the major axis of rotation, and the main body also includes a similar bearing surface. In one example, the arrangement of differential gears includes a spider component which is slidably received in a radial aperture in the casing, and the method includes the step of arranging the ring gear over the aperture to prevent or limit radial movement of the spider component, in use. In one example, the ring gear is fitted over the center line of the differential gears.

According to a still further aspect of the invention, there is provided a method of assembling a differential mechanism including a casing having a major axis of rotation and defining a chamber for an arrangement of differential gears. The casing includes a main body having an opening through which the differential gears are intended to be fitted in the casing, and the casing also has a cover for the opening. The differential mechanism further includes a ring gear for mounting about the casing. The method includes the steps of mounting the cover over an open end of the main body, securing the cover onto the main body by a laser weld along a generally radial line of interface between the main body and the cover, fitting the ring gear onto an external surface of the casing, and securing the ring gear on the casing by a laser weld along a generally radial line of interface between the ring gear and the main body. There is also provided a differential assembly made according to the above method.

In one example, the laser weld between the cover and the main body is formed as a generally annular weld that is concentric with the axis of rotation. In one example, the laser weld between the casing and the ring gear is formed as a generally annular weld that is concentric with the axis of rotation. In one example, the main body is rotated about the axis during welding.

In one embodiment, a relief region is provided adjacent the interface between the ring gear and the casing for accommodating the end of a laser weld tool proximate the radial interface for directing a weld beam along the interface. In one example, the cover is used to clamp the differential gears in an operative condition within the casing. In one example, the cover includes a bearing surface for rotatably supporting one of the differential gears for rotation about the axis, and the main body also includes a similar bearing surface.

In one example, the arrangement of differential gears includes a spider component which is slidably received in a radial aperture in the casing, and the cover includes a projection arranged to sit over the aperture to prevent or limit radial movement of the spider component, in use. In one example, the cover includes a plurality of spider components, each slidably received in a respective radial aperture in the casing. The cover includes a plurality of projections concentric with the axis of rotation which are arranged to sit over the apertures to prevent or limit radial movement of the spider components, in use. The ring gear is configured to be mounted about the projections. In one example, the ring gear is fitted over the center line of the differential gears.

According to a yet further aspect of the invention, there is provided a method of assembling a differential mechanism. The differential mechanism includes a casing having a major axis of rotation and defines a chamber for an arrangement of differential gears. The casing includes two substantially symmetrical body parts, each being configured for receiving half of the differential gear arrangement. The differential mechanism further includes a ring gear for mounting about the casing. The method includes the steps of uniting the two body parts, securing the two body parts together by a laser weld along a generally radial line of interface, fitting the ring gear onto an external surface of the casing, and securing the ring gear on the casing by a laser weld along a generally radial line of interface. There is also provided a differential assembly made according to the above method.

In one example, the laser weld between the two body parts is formed as a generally annular weld, concentric with the axis of rotation. In one example, the laser weld between the casing and the ring gear is formed as a generally annular weld, concentric with the axis of rotation. In one example, the main body is rotated about the axis during welding.

In one example, a relief region is provided adjacent the interface between the ring gear and the casing for accommodating the end of a laser weld tool proximate the radial interface for directing a weld beam along the interface. Preferably, each body part includes a bearing surface for rotatably supporting one of the differential gears for rotation about the axis.

In one example, the arrangement of differential gears includes a spider component which is secured in an operative condition against substantial radial movement by cooperation between the two body parts. In one example, the ring gear is fitted over the center line of the differential gears. The line of radial interface between the casing and the ring gear comprises a radial flange provided on one of the body parts, for example.

For each of the above methods, there is also provided an array of components suitable for assembly of a differential mechanism according a respective one of the methods, particularly including a casing and a crown wheel suitably configured for connection to one another, using axial and/or radial weld lines.

BRIEF DESCRIPTION OF THE DRAWINGS

Other features and aspects of the invention will be readily apparent from the following description of preferred embodiments, as shown by way of example only in the accompanying drawings, in which:

FIG. 9 is a perspective exploded view from a first end of a still further differential gear assembly;

DETAILED DESCRIPTION OF THE PREFERRED EMBODIMENT

Figure 1:
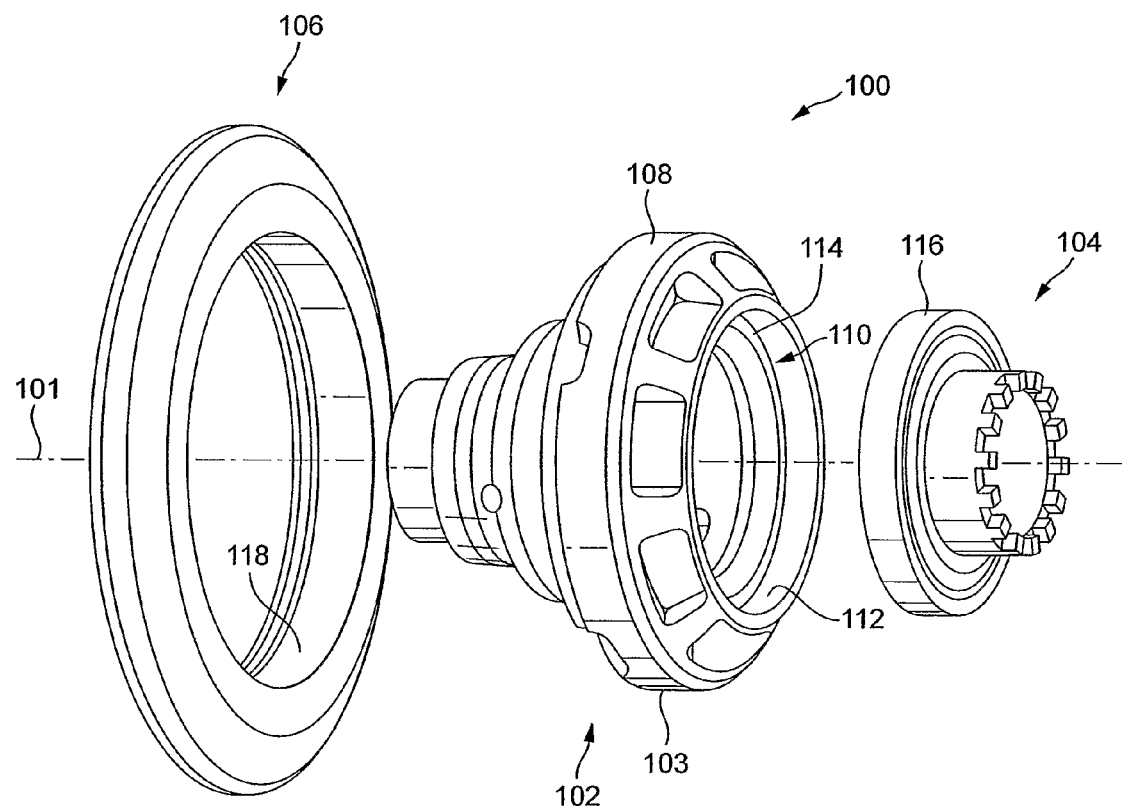
FIG. 1 is a schematic exploded view of a differential.

Referring to FIG. 1, there is shown a differential 100 having a main body 102, a plug-type cover 104 for the main body 102, and an annular crown wheel or annular ring gear 106 adapted for mounting on the main body 102.

The main body 102 is in the form of a unitary, symmetrical and bowl-like housing which defines a major axis of rotation 101. The main body 102 is formed with an annular band 103 concentric with the axis of rotation 101, which defines the greatest outer diameter of the main body 102. The annular band 103 has an annular wall 108 extending parallel or substantially parallel to the major axis of rotation 101. In this embodiment, the annular wall 108 is free from projections or the like such that the crown wheel may be positioned on the annular wall 108 from either axial direction, if desired.

The main body 102 also has a mouth 110 for receiving the cover 104. The mouth 110 has an internal wall 112 extending parallel with the major axis of rotation 101, which terminates at a radial shoulder 114 concentric with and orthogonal to the major axis of rotation 101. The cover 104 is configured to be seated on the radial shoulder 114 and has an external wall 116 configured to nest within the internal wall 112 of the mouth 110. The annular ring gear 106 defines an annular internal wall 118 which is specifically configured, in this embodiment, to be press-fitted into tight engagement with the annular wall 108 of the annular band 103.

Figure 2:
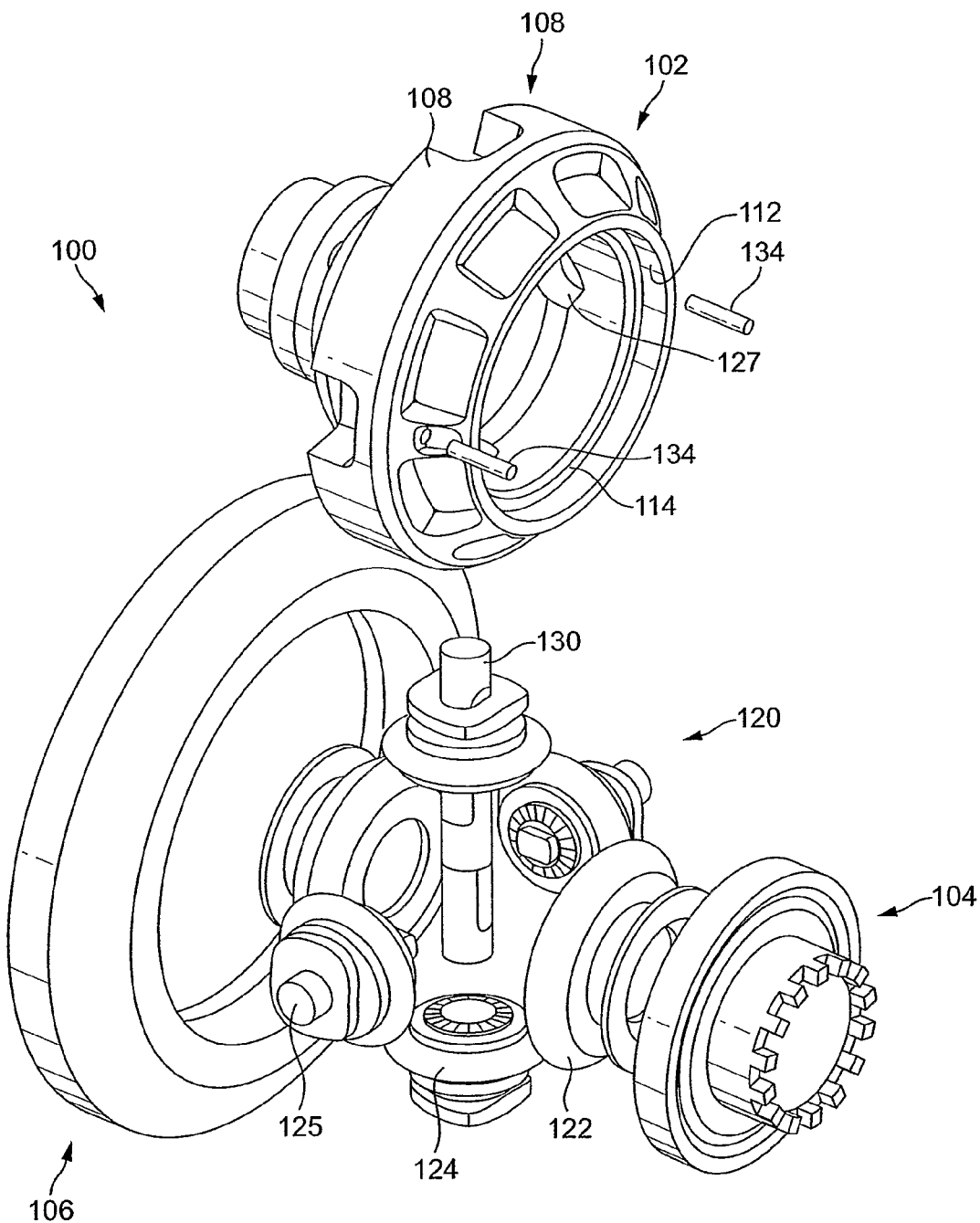
FIG. 2 is a view similar to FIG. 1, showing internal gear components of the differential.
Figure 3:
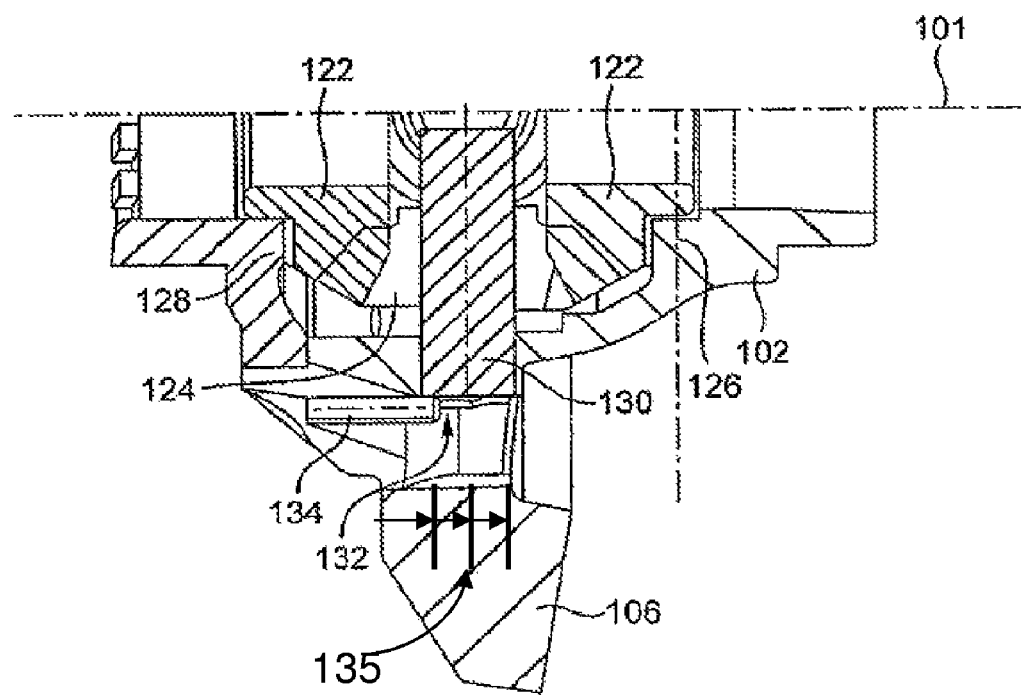
FIG. 3 is an axial cross-section through part of the differential shown in FIG. 1 when assembled.

In use, the main body 102 and the cover 104 form a casing for a differential gear arrangement 120 shown in FIG. 2 and includes two side gears 122 and four pinion gears 124. As shown in FIG. 3, the main body 102 defines a shoulder 126 for supporting one of the side gears 122 for rotation about the major axis of rotation 101. The cover 104 also defines a similar shoulder 128 for rotatably supporting the other of the side gears 122.

A spider 130 is provided on which two of the pinion gears 124 rotate. The ends of the spider 130 are intended to be slidably received in opposing radial apertures 132 in the main body 102. Pins 134 are used to prevent radial movement of the spider 130, in use. In one example, the pins 134 include socket head screw-threaded inserts having a tapered end which are arranged to be wedged into abutment with a respective end of the spider 130, thereby preventing movement of the spider 130 in a radial direction. The remaining two pinion gears 124 include shafts 125 which are intended to be rotatably received in complimentary opposing apertures 127 (FIG. 2) in the main body 102 which are orthogonal to the radial apertures 132.

Figure 4:
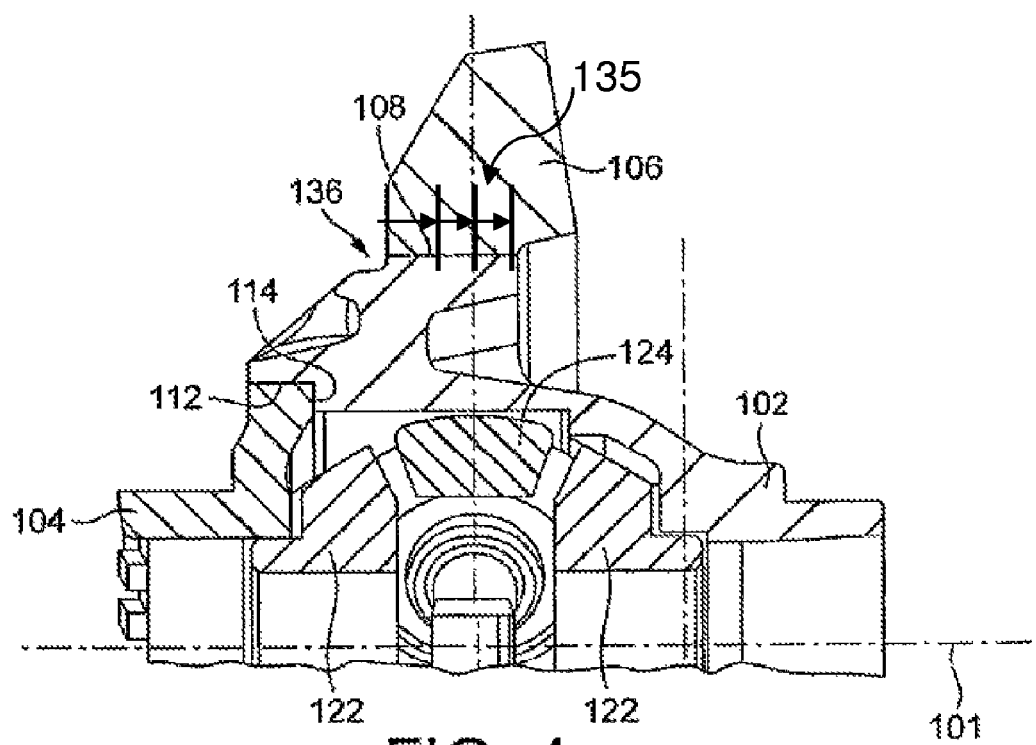
FIG. 4 is similar to FIG. 3, showing an axial cross-section through a further part of the differential shown in FIG. 1.
Figure 5:
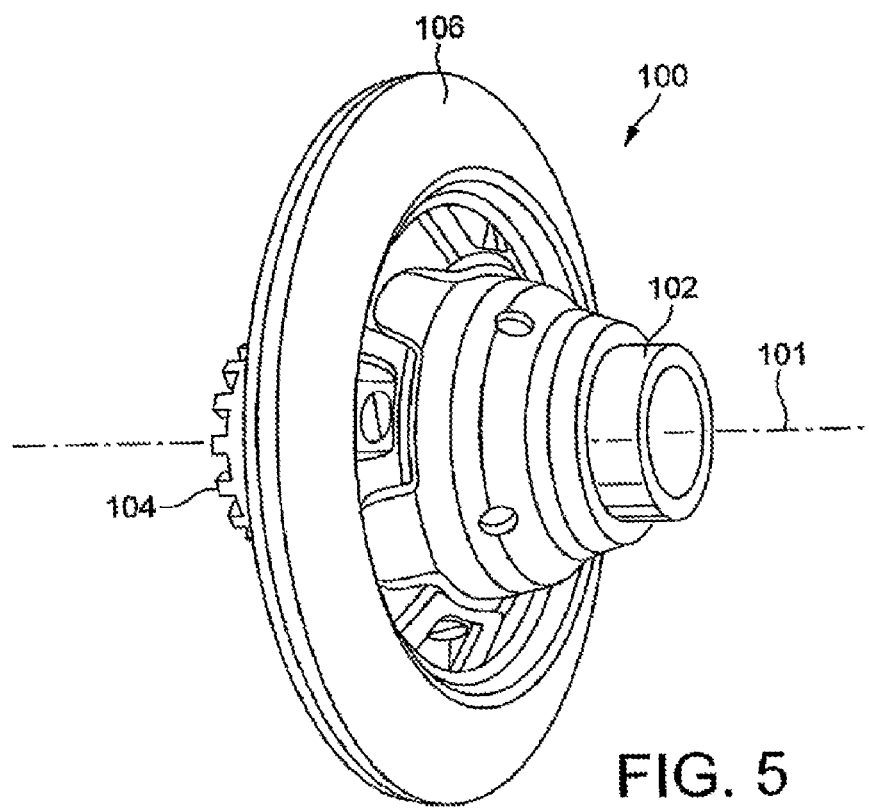
FIG. 5 is a perspective view from a first end of the differential of FIGS. 1 to 4, as assembled.
Figure 6:
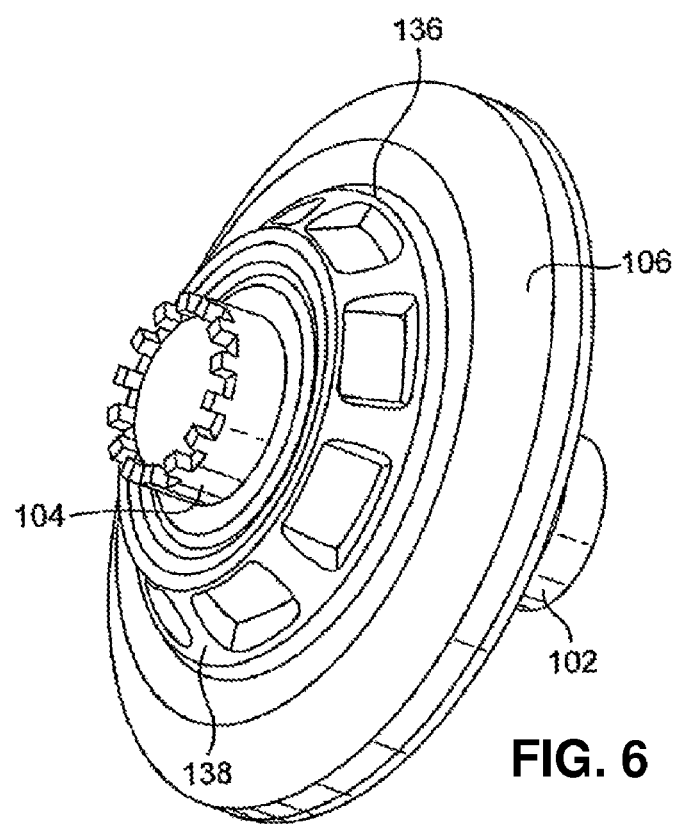
FIG. 6 is similar to FIG. 5, showing a perspective view from a second end of the assembled differential.

The differential 100 is shown in a fully assembled state in FIGS. 5 and 6, and other constructional features of the differential 100 are readily apparent from FIGS. 1 to 6. A typical method of assembly of the differential 100 is as follows. First, the individual components of the differential gear arrangement 120 are fitted into the main body 102 through the mouth 110, in turn. In particular, one of the side gears 122 is fitted into rotational abutment with the shoulder 126 in the main body 102. The pinion gears 124 are then positioned in their respective mountings in the main body 102 with the spider 130 held in position against radial movement by the pins 134, as shown in FIG. 3.

The other side gear 122 is then positioned in the main body 102 in engagement with the adjacent pinion gears 124 before the cover 104 is fitted into the mouth 110 of the casing on the radial shoulder 114. The respective side gear 122 is thereby rotatably supported by the shoulder 128 of the cover 104, with the differential gear arrangement 120 clamped in an operative condition within the casing. In this embodiment, the cover 104 is secured on the main body 102 by laser welding. In particular, an axial laser weld is formed between the external wall 116 of the cover 104 and the internal wall 112 in the mouth 110 of the main body 102.

The annular ring gear 106 is press-fitted into engagement with the external annular wall 108 of the main body 102 to assume the position shown in FIGS. 3 and 4 over the center line of the differential gear arrangement 120. Advantageously, the differential gear arrangement 120 is such that the annular ring gear 106 can be pressed onto the main body 102 and positioned at one of a plurality of predetermined axial or stop locations 135 along the annular wall 108 for use with pinions of different ratios. It should be noted that the annular ring gear 106 is also secured on the main body 102 by laser welding. In particular, the differential gear arrangement 120 is configured such that an axial laser weld can formed between the external wall 116 of the main body 102 and the annular internal wall 118 of the annular ring gear 106.

As can be seen in FIGS. 3 and 4, the exterior of the main body 102 includes a relief region 136 adjacent the axial annular wall 108. The relief region 136 is provided to give clearance for the end of a laser weld tool proximate the interface between the annular ring gear 106 and the casing for directing a high energy weld beam along the interface, in axial alignment therewith, unhindered by the exterior of the main body 102. By enabling close proximity between the end of the welding tool and the area intended to be welded, the accuracy and integrity of the welded connection along the interface can be improved.

In this embodiment, the relief region 136 is in the form of a curved, substantially S-shaped step-like wall surface leading to an axially tapering side wall 138 which extends away from the annular ring gear 106 towards the major axis of rotation 101.

Preferably, the axial welding between the cover 104 and the main body 102 takes place before the axial welding between the main body 102 and the annular ring gear 106 using a single weld tool arranged to move radially between first and second weld positions. However, it may be convenient to use a pair of concentrically arranged laser welding tools (not shown), each being configured to fire an axially directed welding beam for welding simultaneously. The single tool or pair of tools can be caused to move about the major axis of rotation 101 of the main body 102. However, the tool can remain stationary, and the main body 102 or casing is caused to rotate during welding to create the respective annular welds.

It should be noted that the main body 102 is of a general flowerpot type construction, As such, it will be appreciated that the arrangement shown in FIGS. 1 to 6 permits the major control surfaces of the differential casing to be provided on the main body 102, thus ensuring that critical machining can be performed without loss of position, as may occur during certain kinds of transfer machining, for example. The cover 104 can therefore be a relatively simple plug which defines the remaining control surface.

The annular wall 108 is preferably greater in length than the length of the annular internal wall 118 on the annular ring gear 106 so that the annular ring gear 106 can be pressed onto the annular band 103 by different amounts, as required for different drive shaft pinions.

Figure 7:
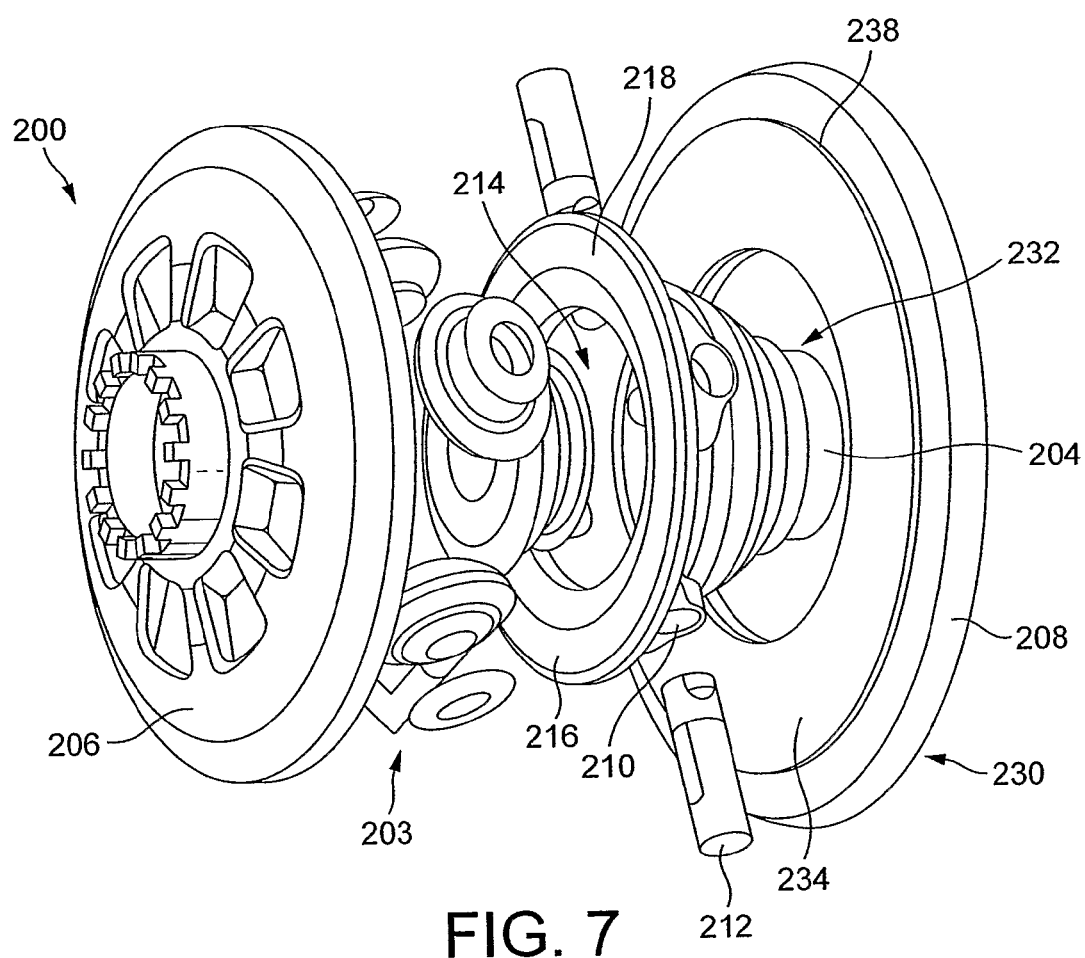
FIG. 7 is a perspective exploded view from a first end of a further differential.

Referring now to FIGS. 7 and 8, a further differential assembly 200 having a casing 202 defining a major axis of rotation 201 is shown. The casing 202 defines a chamber for a differential gear arrangement 203 similar in construction to the gears described above and indicated in FIG. 7.

The casing 202 is split down a line which is parallel and offset, to the left as viewed in FIG. 8, from a transverse center line 205. As such, the casing 202 has a main body 204 in the form of a unitary bowl-like housing, and a lid-type cover 206 for the main body 204. As with the embodiment of FIGS. 1 to 6, the differential gear arrangement 203 is intended to be operatively clamped between the main body 204 and cover 206.

The differential assembly 200 further includes an annular ring gear 208 adapted to be fixed for rotation with the main body 204 about the major axis of rotation 201, as will be described in more detail below.

The main body 204 has two pairs of opposing apertures 210 which lie along the transverse center line 205 orthogonal to one another. The apertures 210 are adapted for slidably receiving the end of respective spider components 212 for rotatably supporting the usual pinion gears, as described above. The main body 204 defines a mouth 214 or opening in FIG. 7. The mouth 214 has a major radial periphery 216 onto which the cover 206 is intended to be fitted for clamping the differential gear arrangement 203 in the main body 204.

Figure 8A:
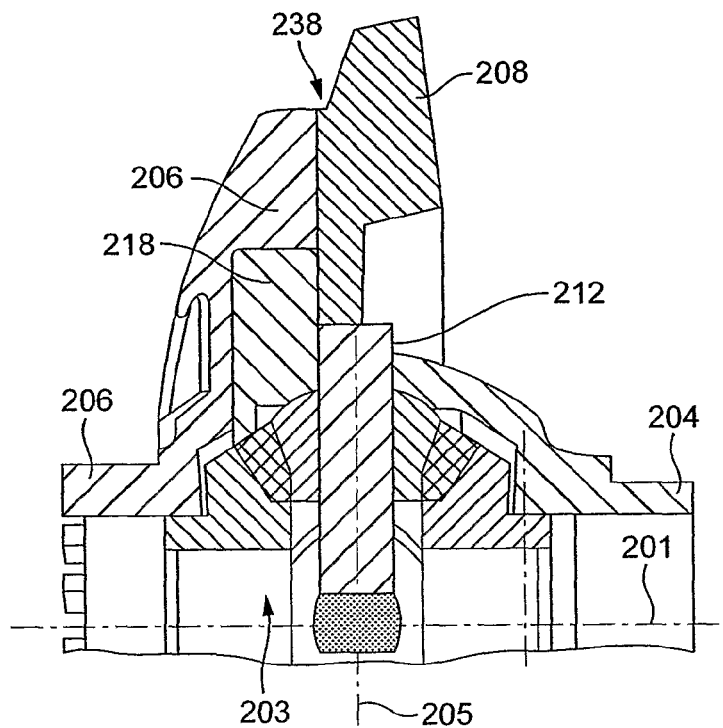
FIG. 8A an axial cross-section through part of the assembly shown in FIG. 7.
Figure 8B:
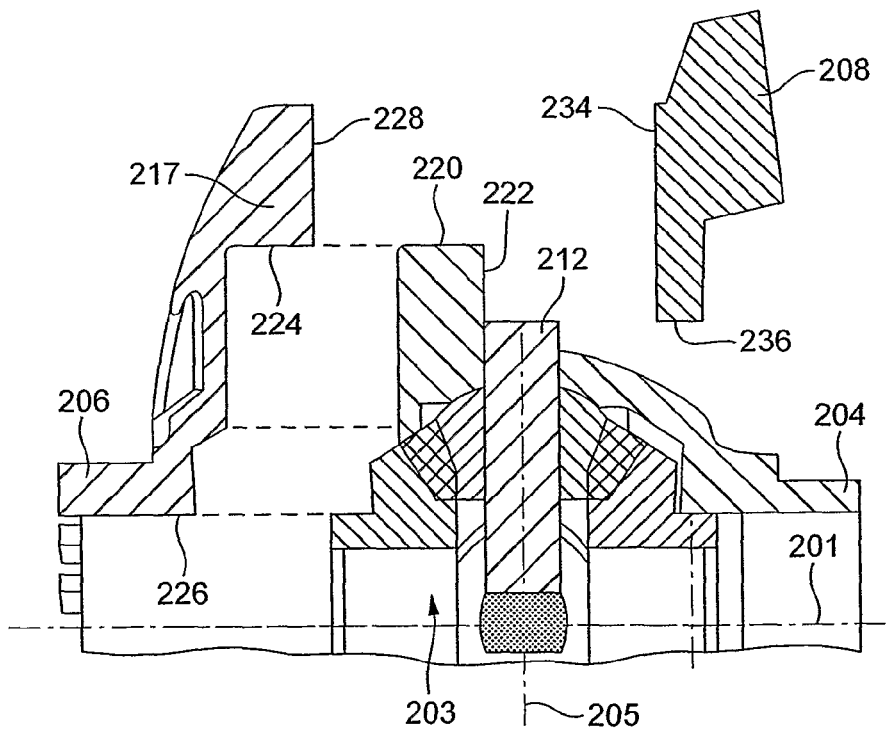
FIG. 8B is similar to FIG. 7, showing a main body, a cover and a ring gear in an unassembled state.

The radial periphery 216 also forms part of an annular flange 218 on the main body 204. As can be seen in FIG. 8B, the annular flange 218 has an axial surface 220 concentric with the major axis of rotation 201, and a radial surface 222, to the right as viewed in FIG. 8, orthogonal to the major axis of rotation 201.

The cover 206 is intended for mounting over the mouth 214 of the main body 204. In particular, the cover 206 defines a step 217 having an annular internal surface 224 which is configured to match and abut the axial surface 220 of the annular flange 218. The cover 206 further defines an internal shoulder 226 for rotatably supporting a side gear of the differential gear arrangement 203. It will be understood that the main body 204 also defines a similar shoulder. The cover 206 has an outer radial abutment surface 228 which is arranged to sit in line with the radial surface 222 of the main body 204, which is itself in line with a periphery of the apertures 210 for the spider components 212.

The annular ring gear 208 has an annular body 230 defining a central aperture 232 for mounting the annular ring gear 208 on the main body 204 concentric with the major axis of rotation 201. The annular ring gear 208 also defines a radial abutment surface 234 which is intended to be arranged in contact with the outer radial abutment surface 228 of the cover 206, as shown in FIG. 8A. Furthermore, the central aperture 232 defines an internal axial surface 236 which is configured to be arranged over at least a portion of the apertures 210 in the casing 202, as shown in FIG. 8A, to prevent or limit radial movement of the spider components 212. This arrangement thereby eliminates the need for positive spider staking elements, such as the pins in the above embodiment.

As can be seen most clearly in FIG. 8A, a relief in the form of a step 238 is provided between the outer radial abutment surface 228 and the exterior of the annular ring gear 208. The step 238 provides a clearance to enable a weld tool to be positioned proximate the interface between the annular ring gear 208 and the main body 204, in alignment therewith, for improving the accuracy and integrity of the welded connection along the interface.

Other constructional features of the differential assembly 200 are readily apparent from FIGS. 7, 8A and 8B. To assemble the differential assembly 200, the cover 206 is united with the main body 204 with the gear arrangement rotatably clamped therebetween and with the spider components 212 located in the apertures 210 in the main body 204, as shown in FIG. 8.

A laser welding tool (not illustrated) is used to form an axial laser weld between the annular internal surface 224 of the cover 206 and the axial surface 220 of the main body 204, thereby forming a unitary casing 202.

The welding tool is then moved away from the casing 202 so that the annular ring gear 208 can be fitted over the main body 204 to assume the position as shown in FIG. 8. With the annular ring gear 208 so positioned, a laser welding tool is then used to form an annular and radially extending laser weld along the interface between the cover 206 and the annular ring gear 208. As can be seen in FIG. 8, with the annular ring gear 208 welded onto the casing 202, the spider components 212 are prevented from outward radial movement.

Figure 10:
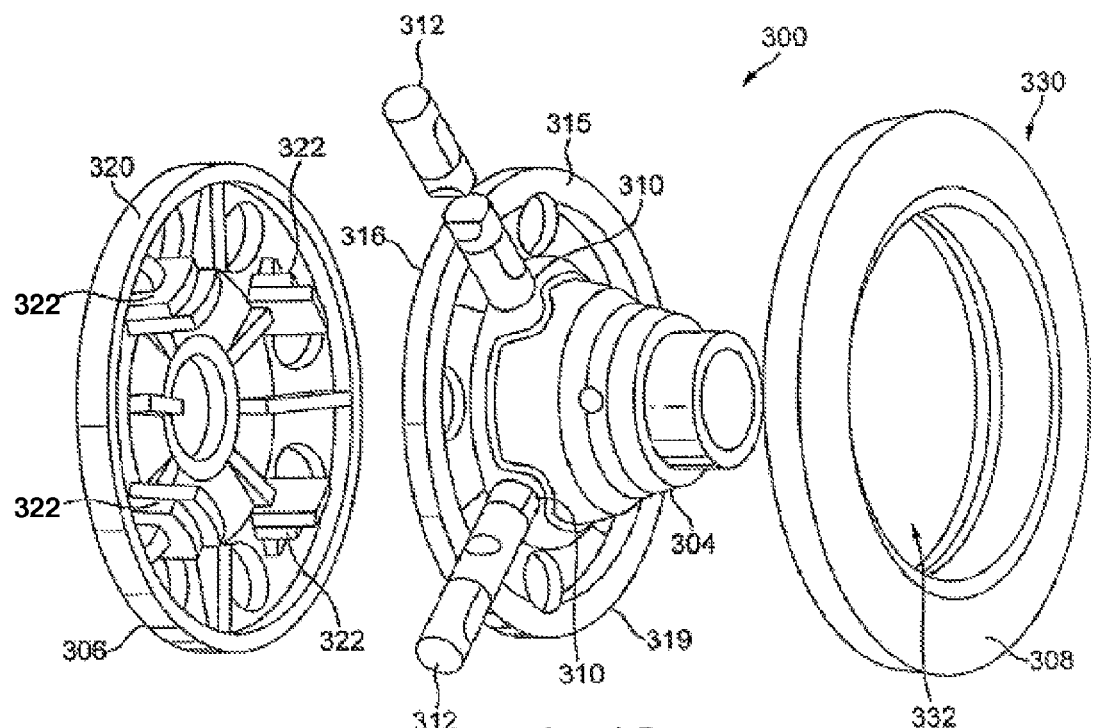
FIG. 10 is a perspective exploded view from a second end of the further differential gear assembly shown in FIG. 9.
Figure 11:
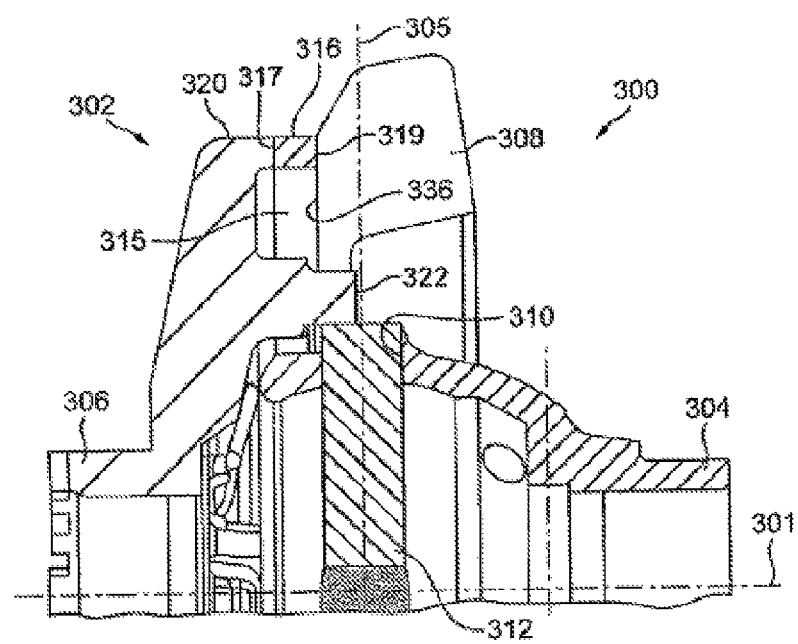
FIG. 11 is an axial cross-section through part of the further differential gear assembly shown in FIGS. 9 and 10.

Referring now to FIGS. 9 to 11, a still further differential assembly 300 is shown. As in the above embodiments, the differential assembly 300 includes a casing 302 defining a major axis of rotation 301. The casing 302 defines a chamber for an arrangement of differential gears (not illustrated) similar in construction to the gears described above.

The casing 302 is split down a line which is offset from a transverse center line 305 orthogonal to the axis of rotation 301 to define a bowl-like main body 304 and a lid-type cover 306. As with the above embodiments, the differential gears are intended to be operatively clamped between the main body 304 and the cover 306 and with side gears rotatably supported on a bearing shoulder formed on the main body 304 and the cover 306. The differential assembly 300 also includes an annular ring gear 308 adapted to be fixed for rotation with the main body 304 about the major axis of rotation 301.

The main body 304 has pairs of opposing apertures 310 which lie along the transverse center line 305. The apertures 310 are adapted for slidably receiving the end of respective spider components 312. However, in this embodiment, radial movement of the spider components 312 is prevented by direct cooperation with the cover 306, rather than direct cooperation with the annular ring gear 308, as explained below.

The main body 304 has a mouth 314 with a radial periphery which defines an external flange 315. The external flange 315 includes an annular axial wall 316 which is parallel with the major axis of rotation 301 and defines the maximum outer diameter of the casing 302. The external flange 315 also has a first radial face 317 for abutment with the cover 306 and a second radial face 319 for abutment with the annular ring gear 308, as will be described below.

The cover 306 has an outer rim 318 with an annular wall 320 which is also parallel with the major axis of rotation 301 and defines the maximum outer diameter of the casing 302. Hence, when assembled in the manner shown in FIG. 11, the external annular wall 320 of the cover 306 lies flush with the annular axial wall 316 of the main body 304.

Two pairs of diametrically opposing projections 322, a first pair arranged at right angles to the other pair, extend in the axial direction from an inner side of the cover 306. The external flange 315 on the main body 304 includes cooperatively spaced apertures 324, which are configured for receiving a respective projection 322 on the cover 306. As can be seen in FIG. 11, the apertures 324 in the main body 304 are arranged so that the projections 322 can extend therethrough and thereby provide an abutment or stop for preventing radial movement of the spider components 312, in use.

The annular ring gear 308 has an annular body 330 defining a central aperture 332 configured for mounting the annular ring gear 308 about the projections 322, as shown in FIG. 11. Furthermore, the annular body 330 includes a radial abutment surface 336 (see FIG. 9) for engagement with the external flange 315 on the main body 304. The radial extent of the radial abutment surface 336 corresponds the radial extent of the external flange 315 as defined by the annular axial wall 316.

The annular ring gear 308 includes a further wall 340 extending away from the radial abutment surface 336 at an angle to the plane of the radial abutment surface 336 and towards the transverse center line 305 to create a convenient relief for the end of a welding tool, as described in the previous embodiments.

Other constructional features of the differential assembly 300 are readily apparent from FIGS. 9 to 11. To assemble the differential assembly 300, the gears are fitted inside the main body 304 and operatively clamped in place by the cover 306. Hence, the spider components 312 are thereby correctly located through their respective apertures 310 and held in place against radial movement by direct contact with the projections 322 on the cover 306. A radial laser weld is formed as an annulus along the interface between the cover 306 and the main body 304, that is to say along the first radial face 317 on the main body 304.

The annular ring gear 308 is then fitted over the projections 322 to assume the position shown in FIG. 11, with the radial abutment surface 336 in abutment with the underside of the external flange 315 on the main body 304. The annular ring gear 308 can then be secured to the external flange 315 by a radial weld along the second radial face 319, again formed as an annulus, concentric with the axis of rotation 301. As such, the external flange 315 is effectively sandwiched between the cover 306 and the annular ring gear 308.

Figure 12:
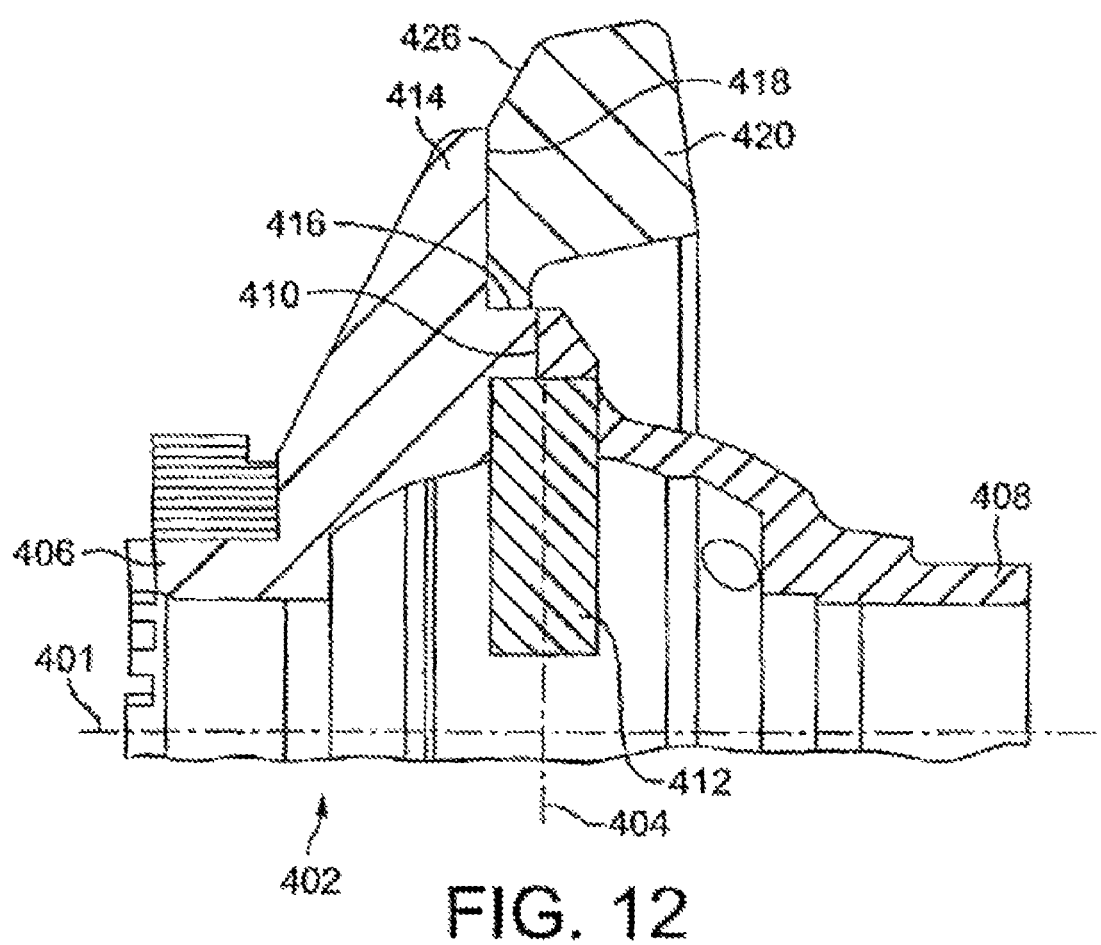
FIG. 12 is an axial cross-section through part of a yet further differential gear assembly.

Referring now to FIG. 12, a further differential assembly 400 is shown. The differential assembly 400 includes a casing 402 defining a chamber for an arrangement of differential gears (e.g., as described above), with side gears rotatably supported on opposing bearing surfaces within the casing 402. The casing 402 has a major axis of rotation 401.

The casing 402 is split down a transverse center line 404 to define two opposing casing parts 406 and 408. The casing parts 406 and 408 each define a radial abutment surface 410 configured to match and abut one another. When brought together, the casing parts 406 and 408 define opposing recesses for receiving the end of a respective spider component 412.

A first casing part 406, to the left as viewed in FIG. 12, includes an outer radial flange 414 defining an annular step having an axial face 416 and a radial face 418. The step is concentric with the major axis of rotation 401.

An annular ring gear 420 is intended to be fixedly mounted on the casing 402 for rotation therewith about the major axis of rotation 401. In particular, the annular ring gear 420 has an axial abutment surface 422 arranged to locate the annular ring gear 420 on the axial face 416 of the casing 402 and a radial abutment surface 424 configured to match and abut the radial face 418 on the casing 402.

Figure 13:
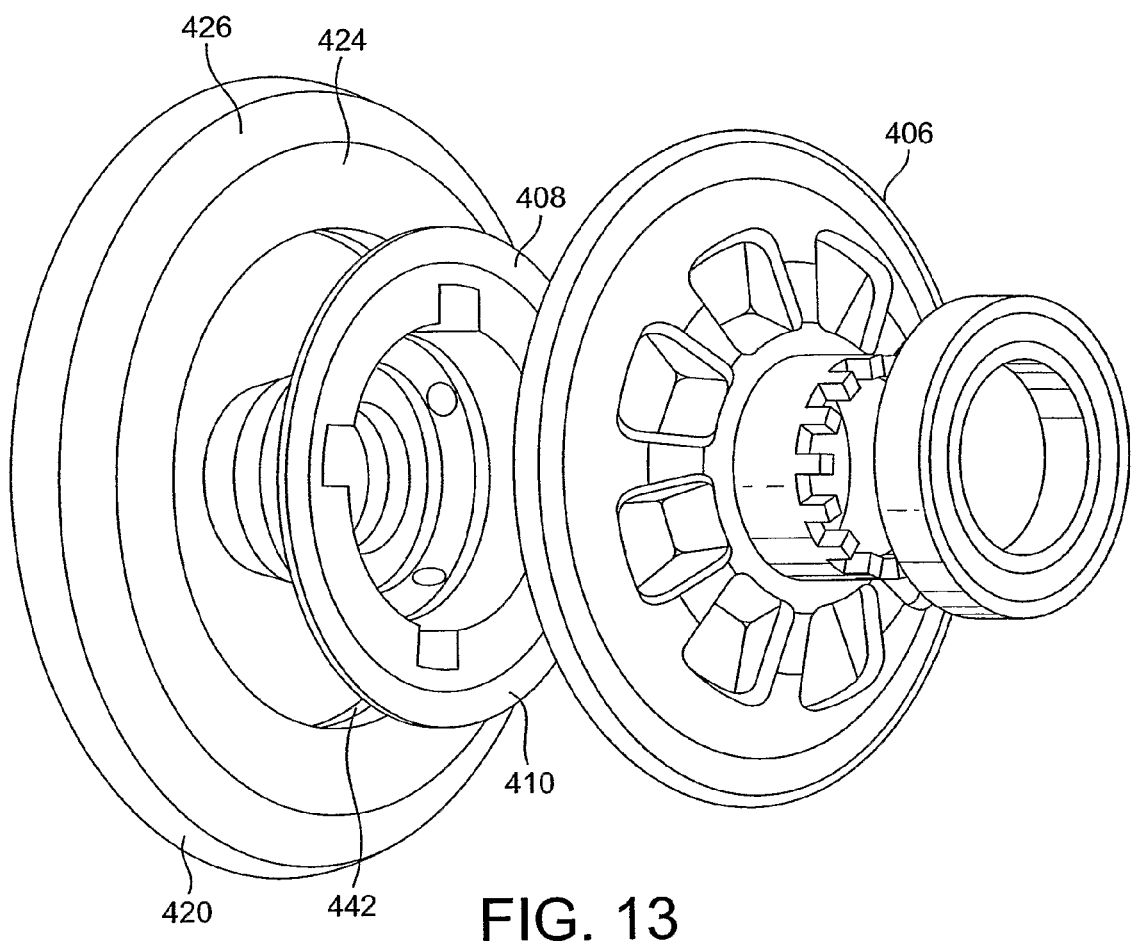
FIG. 13 is a perspective exploded view from a first end of the assembly shown in FIG. 12.

The annular ring gear 420 is intended to be laser welded onto the casing 402 by a radially directed beam along the radial interface between the annular ring gear 420 and the casing 402. To facilitate accurate welding, an exterior portion of the annular ring gear 420 has an outer surface 426 which is angled away from the plane of the radial abutment surface 424 towards the center line of the casing 402. This creates a convenient relief for the proximal positioning of the end of a weld tool to improve the accuracy and integrity of the welded connection between the ring gear and the casing, as described above. Other constructional features of the differential assembly 400 are readily apparent from FIGS. 12 and 13.

A typical method of assembly of the differential assembly 400 is as follows. First, the differential gears are mounted in their respective casing parts 406 and 408, and the two parts 406 and 408 are then united. Accordingly, the gear arrangement is clamped for rotation between the casing parts 406 and 408, with the spider components 412 fixed against radial movement in their respective recesses. The two casing parts 406 and 408 are then laser welded together along the radial abutment surfaces 410.

The annular ring gear 420 is then fitted over the step on the casing in tight fitting engagement with the axial face 416, as indicated in FIG. 12, such that the annular ring gear 420 sits over the center line 404 of the casing 402.

A laser weld tool is then arranged proximate the interface between the annular ring gear 420 and the casing 402, and an annular radially extending laser weld is then formed along the interface.

The above described embodiments provide laser welded differentials, thus avoiding the need for mechanical bolting between the casing components, e.g., the main body, the plug or cover, and the ring gear. This is results in a differential which can be assembled with a reduced number of operations, while reducing component costs and overall weight. The overall rigidity of the differential is also greatly improved. Furthermore, the casings are more efficient, in use, whereby the absence of bolt heads or the like within the structure significantly reduces churning losses associated with bolted differentials.

In each of the above embodiments, the casing is made from forged steel, and the crown wheel is made from case hardened steel, for example.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A method of assembling a differential mechanism comprising the steps of:
   providing a differential mechanism including a casing having a major axis of rotation and defining a chamber for an arrangement of differential gears, the differential mechanism including a ring gear for mounting about the casing:
   fitting the ring gear onto an external surface of the casing;
   securing the ring gear on the casing by at least one laser weld along a generally axial line of interface between the casing and the ring gear;
   wherein the ring gear is press-fitted onto the casing by a predetermined amount so that the differential mechanism is thereby configured for use with a drive shaft pinion of a predetermined ratio;
   wherein the casing defines a plurality of stop locations for the ring gear, the plurality of stop locations each defining a position for the ring gear which enables the differential mechanism to be used with drive shaft pinions of different predetermined ratios, and the step of fitting the ring gear onto the casing comprises the step of fitting the ring gear to a predetermined one of the plurality of stop locations so that the differential mechanism is thereby configured for use with the drive shaft pinion of the predetermined ratio.

2. The method according to claim 1, wherein the casing includes a main body having an opening, and a cover for close-fitting engagement in the opening, whereby the arrangement of differential gears is operatively clamped in the casing between the main body and the cover, and the cover is secured on the main body by an axial laser weld.

3. The method according to claim 2, wherein the cover includes a bearing surface for rotatably supporting one differential gear for rotation about the major axis of rotation.

4. The method according to claim 1, wherein the casing includes an annular wall and including defining the plurality of stop locations along the annular wall.

5. The method according to claim 4, wherein the annular wall extends substantially parallel to the axis of rotation and including defining the plurality of stop locations at different axial positions along the annular wall.

6. The method according to claim 1, wherein the external surface of the casing defines an annular band onto which the ring gear is fitted.

7. The method according to claim 1, wherein the ring gear is fitted over a center line of the arrangement of differential gears.

8. The method according to claim 1, wherein the casing is rotated about the major axis of rotation during welding.

* * * * *